United States Patent [19]

Priest

[11] 4,224,374
[45] Sep. 23, 1980

[54] POLYETHER-DERIVED POLYURETHANE FOAM IMPREGNANT AND METHOD OF APPLICATION

[75] Inventor: David C. Priest, Richmond, Va.

[73] Assignee: Reeves Brothers, Inc., New York, N.Y.

[21] Appl. No.: 962,637

[22] Filed: Nov. 21, 1978

[51] Int. Cl.³ .................... B32B 3/26; C08L 13/02
[52] U.S. Cl. .................... 428/310; 260/29.7 H; 260/29.7 P; 260/DIG. 24; 428/311; 428/921; 427/244; 521/53; 521/54; 521/903; 521/906
[58] Field of Search .............. 521/53, 54, 903, 906; 428/310, 311, 315, 921; 260/29.7 H, 29.7 P, DIG. 24; 427/244

[56] References Cited

U.S. PATENT DOCUMENTS

| | | | |
|---|---|---|---|
| 3,347,837 | 10/1967 | Smith | 526/223 |
| 3,651,037 | 3/1972 | Snow, Jr. | 260/23.7 H |
| 3,717,597 | 2/1973 | Hesskamp | 521/906 |
| 3,839,241 | 10/1974 | Harrell, Jr. | 260/29.7 N |
| 4,076,878 | 2/1978 | Norby | 428/310 |
| 4,130,528 | 12/1978 | Chen | 260/29.7 H |
| 4,172,067 | 10/1979 | Benton et al. | 260/29.7 H |
| 4,174,420 | 11/1979 | Anolick et al. | 428/310 |

FOREIGN PATENT DOCUMENTS

| | | | |
|---|---|---|---|
| 2649222 | 5/1977 | Fed. Rep. of Germany | 428/311 |
| 1499168 | 1/1978 | United Kingdom . | |
| 1519795 | 8/1978 | United Kingdom | 428/311 |

*Primary Examiner*—William J. Van Balen
*Attorney, Agent, or Firm*—Pennie & Edmonds

[57] ABSTRACT

A unique substantially non-flammable impregnant for polyether-derived polyurethane foam substrates is disclosed. The impregnant is characterized by a carboxylated neoprene latex and an alumina trihydrate. It can be further characterized by a diammonium hydrogen phosphate, urea, a magnesium-zinc complex, a surfactant and water.

A method for applying the impregnant to the mentioned substrate is also disclosed. That method is characterized by depositing the impregnant on the substrate, impregnating and curing it, and recovering a substantially non-flammable product. That impregnated polyether-derived polyurethane foam product can be configured as a laminate and adhered to some other substrate. Articles like mattresses and cushions can be advantageously fabricated using the unique impregnant.

18 Claims, 1 Drawing Figure

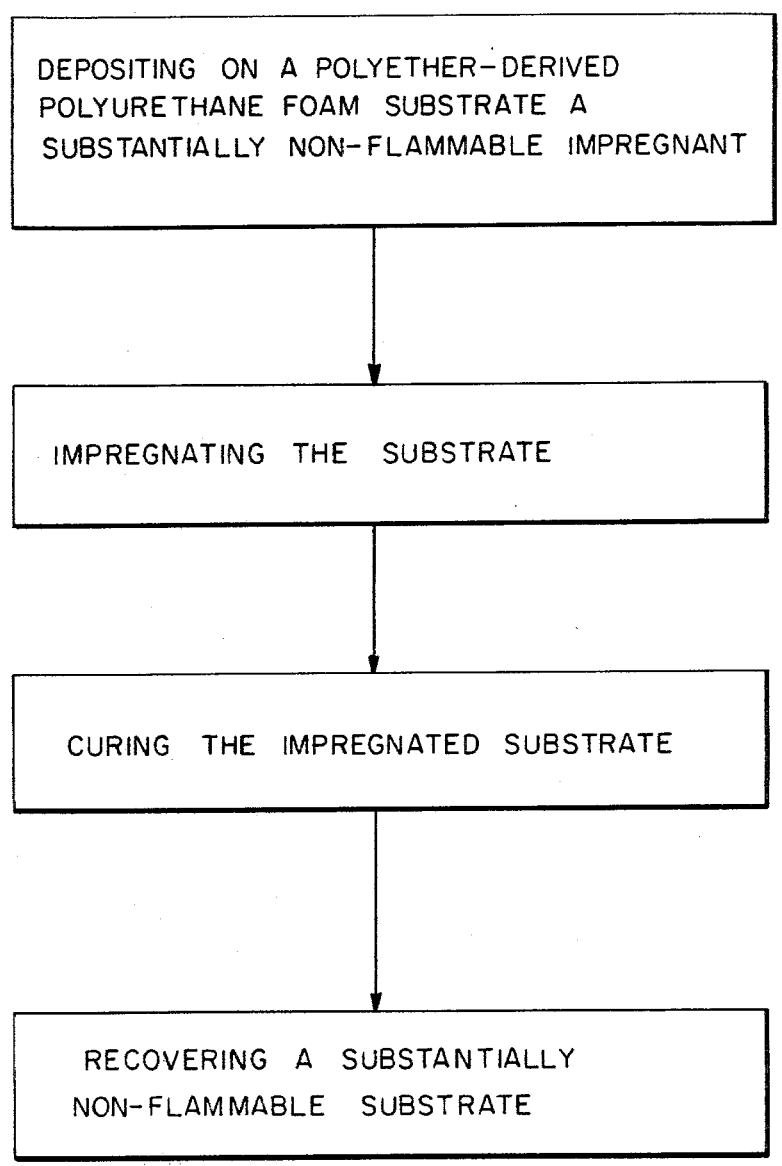

POLYETHER-DERIVED POLYURETHANE FOAM IMPREGNANT AND METHOD OF APPLICATION

TECHNICAL FIELD

The subject invention relates to the production of flexible cellular products formed from polyether-derived polyurethane. Polyurethane foam is used to fabricate mattresses, cushions and thermal insulators. However, untreated polyurethane products readily ignite when contacted with an ignition source. The present invention is directed to treatment of such products to inhibit flammability.

BACKGROUND ART

Polyurethane foam substrates are widely used materials. Such polymeric substrates are ordinarily manufactured by a casting process in which a mixture of liquid polyurethane-foam-generating reactants are deposited in a mold. Evolution of a gas causes the reactants to foam. For some foam formulations, the reactants themselves react to evolve sufficient gas; in others, a blowing agent is mixed with the reactants to provide gas evolution. Continued gas evolution causes the foam to expand and fill the mold. The foam becomes increasingly viscous as the reactants polymerize, ultimately curing into a polyurethane foam casting shaped by the mold.

Through the years, a number of methods for reducing flammability of flexible cellular products have been reported. One such method involved addition of halogen, antimony or phosphorous containing compounds to the foam reactants prior to fabrication of a product. However, the addition of those compounds impaired physical characteristics of the product. Specifically, flexibility and resiliency were affected. Also, these flame retardant compounds afforded minimal protection against flame penetration because the product melted when contacted by a flame.

A second reported method impregates a preformed cellular material with a flame retardant composition like an ammonium phosphate solution. This method improved resistance to ignition, but the physical characteristics of the impregnated product were inferior.

A third method according to Belgain Pat. No. 841,224, published Oct. 28, 1976, coats flexible polyurethane foam with a flame retardant. The coating can comprise a carboxylated neoprene latex and a mineral hydrate, such as alumina trihydrate. At combustion temperature, the function of the coating is to release water and thereby cool an ignited foam surface. A carbon char is formed during ignition.

DISCLOSURE OF THE INVENTION

The subject invention is a patentable improvement over the prior art. The water-based impregnant of the subject invention not only imparts desirable physical characteristics to a flexible foam, but also renders substantially non-flammable polyether-derived polyurethane foam substrates to which it has been applied.

Typically, the subject water-based formulation includes a carboxylated neoprene latex and an alumina trihydrate; and it can also include diammonium hydrogen phosphate, urea, a surfactant, a bi-metallic salt complex and water. A typical impregnant formulation appears below;

| | |
|---|---|
| Carboxylated Neoprene Latex | 100 grams |
| Alumina Trihydrate | 125 grams |
| Diammonium Hydrogen Phosphate | 5 grams |
| Urea | 75 grams |
| Surfactant | 1 gram |
| Water | As required |

The subject formulation should have a low viscosity to facilitate impregnation of substrates as well as a high total solid content. The viscosity of the formulation is preferably between about 2600 centipoise and about 5500 centipoise. The formulation can be applied to a substrate by any conventional means like dipping, coating or spraying. Cured impregnated foam can be laminated to other substrates. An object of the present invention is to render polyether-derived polyurethane foam substantially non-flammable. Another object is to form a carbon char, having superior stability and physical strength and the release of water to cool the substrate surface when the foam is contacted by an ignition source. It is a further object of the invention that the impregnated foam have a low flammability and form a minor amount of smoke and non-toxic gases when ignited. Another object is the formation of an impregnated foam that has an open, breathable surface and retains its physical characteristics.

Impregnated products of the subject invention are useful in a variety of environments. For example, breathable, yet non-flammable foam products of the subject invention can be used in mattresses to mitigate hospital patient bed sore problems. Similarly, the subject foams have application in mass transit vehicles and in penal institutions where vandalism and arson are potential hazards. The impregnating formulation of the subject invention can also be used to impregnate fabrics as well as to control acoustics where porosity and flammability of the product are also important.

The novel features which are characteristic of the invention, both as to the formulation of the impregnant and the application of that impregnant to a porous substrate, together with further objectives and advantages thereof, will be better understood from the following description in connection with the examples illustrating the preferred embodiments of the invention. However, the following description and illustrated examples are descriptive only and not intended as a definition of the limits of the invention.

BRIEF DESCRIPTION OF THE DRAWING

The method of carrying out the invention is diagrammatically described in the sole FIGURE.

BEST MODE FOR CARRYING OUT THE INVENTION

The formulation referred to above comprises the subject invention along with its method of application and products therefrom. In general, the impregnant should be formulated so that it has a low viscosity, high total solids content, forms a stable carbon char, and does not significantly affect the physical properties of a foam substrate. The formulation is designed so that flame retardant characteristics are achieved through a dual mechanism. One mechanism functions to release water and thereby cool an ignited surface of an impregnated foam. Thereafter, the impregnant also forms a thermal insulating carbon char that burns slowly and maintains the structural integrity of the foam. At combustion temperature, the formulation is designed to minimize the formation of smoke and preclude the emission of toxic gases. The product of this invention is substantially non-flammable.

An essential ingredient of the formulation is a carboxylated neoprene latex. That ingredient can be a copolymer of chloroprene with another organic monomer. A suitable monomer is an unsaturated carboxyl acid such as acrylic acid or methacrylic acid. The concentration of this monomer is between about 2% and 20% by weight of the total quantity of copolymer. Typically, the concentration is less than or equal to 5%.

The neoprene latex polymer can be prepared by any known technique. Typically, it is prepared by polymerization in emulsion in the presence of a radical initiator, for example, peroxide or an organic hydroperoxide, and with a chain linking agent such as alkyl-mercaptan or bisulphate of dialkyl-xanthogene. Polymerization techniques are described in detail in U.S. Pat. Nos. 3,651,037, 3,839,241, and 3,347,837 and in Belgian Pat. Nos. 815,662 and 841,224.

A carbonization agent is included in the neoprene polymer formulation. The agent can be any chemical composition which is not volatile at ignition temperatures, is non-flammable or only slightly flammable, does not increase the ignition temperatures, and has a structure which enhances the physical characteristics of a carbon char formed during ignition. Suitable carbonization agents are urea formaldehyde and melamine formaldehyde resins, melamine phosphate, phthalic anhydride and pyromellitic anhydride. Phosphate formations enhance the formation of a carbon char. A suitable concentration of the carbonization agent is between about 5 and 15 parts per 100 parts by weight of neoprene latex.

The other essential ingredient in the formulation is alumina trihydrate. The particle size of the hydrate must be small enoough to give good dispersion and have a broad particle size distribution so that the formulation has a low dispersion viscosity. Typical alumina trihydrates useful in the practice of the invention are 336-SP made of Solem Industries and GHA 132 and GHA 432 made by Great Lakes Mineral Company. Its concentration should be between about 10 and about 180 parts per 100 parts by weight of neoprene latex. Generally, the concentration of the alumina trihydrate is dictated by the degree of flame retardancy that is desired. If the concentration is below the lower limit of the range, only minimal protection is afforded. Beyond the upper limit, good flame retardance is achieved but the integrity of the foam substrate is adversely affected. Alumina trihydrate is a unique metal hydrate because only non-toxic combined or crystallization water is released on heating and because it forms an inert residue, which enhances the structural integrity of the carbon char layer.

The formulation also includes several additives which enhance the fire retardant and physical characteristics of the formulation. Diammonium hydrogen phosphate and urea are two such additives. The concentration of those ingredients should be about 5 parts and about 7.5 parts by weight per 100 parts by weight of neoprene latex, respectively.

Another additive is a magnesium-zinc salt complex like Ongard II sold by National Lead Company. The concentration of this salt complex should be between about 1 to about 5 parts per 100 parts of neoprene latex. Concentrations which exceed the maximum concentration promote excessive cross-linking in the formulation. That increased cross-linking promotes surface cracking on impregnated foam substrates when they are in contact with an ignition source. The overall effect is a reduction in the flame retardant characteristics of the formulation.

Another ingredient in the formulation is a surfactant like a triethanol amine or a 100% active non-ionic fatty acid based surfactant known as Emmersoft 7777 and sold by Emery Industries, Inc. The surfactant permits a reduction in the dispersion viscosity which allows an increase in the dispersion total solids content in the formulation. The effect of this viscosity decrease is to allow reduced amounts of water to be used and thereby improve drying and airing rates. The concentration of the surfactant is between about 1 to about 2 parts per 100 parts by weight of neoprene latex.

Other additives can also and optionally be included in the formulation. For example, fillers like $BaSO_4$ and $CaSO_4$ can be added. Addition of such additives is an alternative to having them included in the foam substrate formulation. Thus, walls of the substrate cells can be coated with such materials. Other materials can also be included.

Because the formulation is water based, its dispersion viscosity can be adjusted with the addition of water. The amount of water, if any, added to the formulation is not critical; and typically, its concentration is between about 1 and about 50 parts per 100 parts by weight of neoprene latex. Desired viscosity is dictated by processing requirements, character of the neoprene latex and particle size and particle size distribution of the alumina trihydrate. Suitable viscosities of the formulation range between about 2600 to about 5500 centipoise. Desirable viscosities are merely those which facilitate the impregnation of a flexible foam substrate.

The ingredients of the subject invention can be formulated in a conventional manner. Generally, alumina trihydrate and additives are premeasured and mixed with the neoprene latex. The neoprene latex is generally formulated with a carbonization agent. For low dispersion viscosity formulations, the surfactant should be added to the neoprene latex first, followed by an aqueous solution of urea and diammonium hydrogen phosphate, if additional water is to be used. The aqueous solution should be added slowly to the latex with vigorous stirring to prevent localized latex coagulation. The resulting formulation is then applied to a flexible foam substrate, which can be laminated to another substrate.

The impregnating formulation of the subject invention is advantageously applied to flexible polyether-derived polyurethane foam substrates. Polyurethane foam can be produced by the reaction of a polyester with a diisocyanate. Such urethanes are polyester-derived polyurethanes. A polyether can be substituted for the polyester; those urethanes are polyether-derived polyurethanes. Desirable substrates are those which have a uniformly open cell structure, because such a structure facilitates impregnation. The foam substrate should selected so as to afford a medium that has a high porosity, which permits uniform impregnation and that has sufficient structural integrity to support the impregnant. Low porosity foams are difficult to impregnate uniformly and, therefore, are subject to cracking if the fire retardant agent is extremely heavy on the surface. Polyether-derived polyurethane foam substrates are essential to the proper practice of the subject invention. Foam substrates that facilitate formation of a carbon char are preferred. The thickness of the substrates are preferably equal to or greater than 3/16 inch in order to provide sufficient flame resistance without being unduly thick so as to crack under thermal stress.

A suitable polyether-derived polyurethane foam substrate is S2850 sold by Reeves Brothers, Inc. S2850 is a halogenated organophosphate polyether foam formulation having a density of 2.8 lb./ft.$^3$ and an indentation load deflection (ILD) of 50. Another suitable polyether substrate is PS 1936 FL also sold by Reeves Brothers, Inc. PS 1936 FL is an organohalide/antimonyoxide polyether formulation. It has a density of 1.9 lb./ft.$^3$ and an ILD of 36. Typically, the polyurethane foam density is at least about 1.0 lb./ft.$^3$.

A foam substrate can be impregnated with the unique fire retardant formulation of the subject invention using any conventional mechanism. One conventional means includes placing a cellular foam on a conveyor means. The means advances the foam past a formulation dispensing means disposed above the foam. The dispensing means can be a reciprocating nozzle which traverses the translating foam and applies a stream of formulation thereon. The impregnated foam can then be passed by a skimming means that spreads or removes the formulation to achieve a desired flame retardancy and texture for the impregnated foam. Of course, the rate of traverse of the dispensing nozzle and the rate of the formulation dispensed from the nozzle can be controlled so that the desired fire retardancy of the impregnant can be achieved without skimming.

Alternatively, the formulation can be directly sprayed on one or all sides of a foam substrate in a uniform thickness using conventional commercial spraying apparatus. Thereafter, the impregnated foam travels through a conventional roller means to nip or to squeeze tightly between them the foam so that the formulation moves deeper into the substrate. Pressure applied by the roller means varied between 2 and 50 psi with application levels varying from 5 to 26 oz/yd$^2$. Then, the impregnated foam is passed through a conventional drier at about 125° F. to about 350° F. for about 5 to about 10 minutes to remove moisture and to allow partial cross-linking to occur. Consequently, the method of the subject invention comprises depositing the impregnant on a polyether-derived polyurethane foam substrate, impregnating and curing it, and recovering a substantially non-flammable product.

When a flame is applied to the present impregnated foams, they do not melt or drip, that is, do not have a tendency to spread flame, as do many known flexible foams. Instead, because of the presence of the unique, substantially non-flammable formulation, the impregnated product converts to a stable cellular carbonaceous barrier. That carbon char is a good heat insulator and prevents the impregnated product from reaching a temperature at which it will ignite. In addition, the product is cooled by the emission of water at relatively high temperatures that result from the decomposition of the alumina trihydrate. Because of this, the surface of the impregnated product in contact with a flame source may be at ignition temperature, but the temperature beneath the surface of the carbon char will be significantly less than that. The impregnation of the product not only inhibits ignition, but also protects against flame penetration.

Coating urethane substrates with the subject formulation is unsuitable because mere topical application permits surface cracks to develop. Such ruptures allow untreated, interior portions of the substrate to ignite. Consequently, impregnation is required. This produces a much more rupture-resistant char on exposure to high heat flux. This characteristic is enhanced by locating the impregnant beneath the surface of the substrate. The closed cell nature of polyester-derived polyurethane foams makes it difficult to achieve sufficient depth of impregnation which makes this substrate unsuitable for use in the subject invention. Impregnated polyester foams and surface coated polyether foams share this defect which results in surface cracking.

EXAMPLES

The following examples illustrate the invention. A flame retardant test procedure was used in each example. The procedure included cutting impregnated foam into approximately 8×9 inch samples. The samples are then glued with a styrene-butadiene rubber-based adhesive to a substrate foam having identical dimensions. The thickness of the laminate is about 1 inch. The laminate is then disposed at a 45° angle above a flame for evaluation. The flame from a Bunsen burner was adjusted to give a six-inch height. The top of the burner was four inches below the sample. Thus, foam was bathed in two inches of flame. Flame temperature was in excess of 1500° F. Evaluation was stopped after 400 seconds if no fire or burn through occurred. The following observations were considered:

1. Time for the flame to cease climbing the sample's surface, i.e., for the foam sample to cease "fighting" or "rebuffing" the flame.
2. Development of cracks in the sample's surface which facilitates the spread of a fire.
3. Smoke formation.
4. Time for foam sample to ignite.
5. Time to burn through the sample.
6. Difficulty in extinguishing ignited sample.
7. Condition of sample after fire retardant evaluation.

EXPERIMENT I

The flame retardant characteristics of several different foams were evaluated using the flame retardant test procedure. One-quarter inch thick unimpregnated foams were laminated to three-quarter inch S2850 foam sold by Reeves Brothers, Inc. A Milligan No. 13-673A adhesive comprising 1,1,1-trichloroethene with a 45% solids content was used to form the laminate. The results are reported in Table I.

TABLE I

| Unimpregnated ¼ Inch Substrate | Burn Through Time (Seconds) | Observations |
|---|---|---|
| Organo Halide Phosphate Polyether Foam: 1.5 lb/ft$^3$ density; 24 ILD (S1524 sold by Reeves Brothers, Inc.) | 29 | Flaming Drops |
| Organo Halide Phosphate Polyether Foam: a 1.5 lb/ft$^3$ density; 23 ILD (S1523 sold by Reeves Brothers, Inc.) | 27 | Flaming Drops |
| Organo Halide Phosphate Polyether Foam: a 1.5 lb/ft$^3$ density; 23 ILD (CS1523 sold by Reeves Brothers, Inc.) | 26 | Flaming Drops |
| Organo Halide Phosphate Polyether Foam: a 2.8 lb/ft$^3$ density; | 24 | Flaming Drops |

TABLE I-continued

| Unimpregnated ¼ Inch Substrate | Burn Through Time (Seconds) | Observations |
|---|---|---|
| a 50 ILD (S2850 sold by Reeves Brothers, Inc.) Organo Halide Phosphate Polyether Foam: a 2.8 lb/ft$^3$ density; | 27 | Flaming Drops |
| a 50 ILD (CS2850 sold by Reeves Brothers, Inc.) Organo Halide/Antimony Oxide Polyether Foam: a 1.9 lb/ft$^3$ density; a 36 ILD (PS1936 FL sold by Reeves Brothers, Inc.) | 35 | Flaming Drops |

EXPERIMENT II

One-quarter inch samples of polyether foams S2850 and PS1936 FL sold by Reeves Brothers, Inc., were impregnated with a copolymer emulsion of water-based carboxylated chloroprene and methlacrylic acid latex (Neoprene Latex 102 manufactured by E. I. DuPont). The impregnant was not diluted with water and cured in an oven for about 5 minutes at 150° C. Each polyether foam was impregnated as follows:
  30 ounces per square yard,
  20 ounces per square yard,
  15 ounces per square yard, and
  12 ounces per square yard.
The impregnated samples were then glued to ¾ inch S2850 polyether foam. Fire retardant characteristics were evaluated. The data appears in Table II.

TABLE II

| ¼ Inch Impregnated Substrate | Amount of Impregnant Equivalent Weight* | Concentration (oz/yd$^2$) | Burn Through Time (Secs.) | Observations |
|---|---|---|---|---|
| S2850 | 28.76 | 7.19 | 113 | Flash fire; Difficult to Extinguish |
| PS1936 FL | 29.56 | 7.39 | ~50 | Flash fire; Difficult to Extinguish |
| S2850 | 20.1 | 5.02 | 77 | Flash fire; Easy to Extinguish |
| PS1936 FL | 25.2 | 6.31 | 49 | Flash fire; Easy to Extinguish |
| S2850 | 14.1 | 3.53 | 165 | Rapid fire; Easy to Extinguish |
| PS1936 FL | 15.7 | 3.93 | 335 | Rapid surface fire; Easy to Extinguish |
| S2850 | 12.8 | 3.20 | 122 | Surface fire |
| PS1936 FL | 15.4 | 3.86 | 45 | Surface fire; Easy to Extinguish |

*Equivalent weight based on optimum formulation of impregnant.

EXPERIMENT III

Experiment II was repeated except that the samples were impregnated with the following formulation:

| | |
|---|---|
| Carboxylated Neoprene Latex (Neoprene Latex 102 sold by E. I. Dupont) | 100 grams |
| Alumina Trihydrate (336 SP sold by Solem Industries) | 125 grams |

The impregnated sample was cured in an oven for about five minutes at 150° C. The results of the fire retardancy evaluation appear in Table III.

TABLE III

| ¼ Inch Impregnated Substrate | Amount of Impregnant Equivalent Weight* | Concentration (oz/yd$^2$) | Burn Through Time (Secs.) | Observations |
|---|---|---|---|---|
| S2850 | 29.7 | 27.40 | >400 | Surface crack at 245 sec. |
| PS1936 FL | 29.7 | 27.40 | >400 | Surface crack at 75 sec. |
| S2850 | 17.4 | 16.0 | 187 | Surface crack at 65 sec. |
| PS1936 FL | 20.9 | 19.26 | >400 | surface crack at 66 sec. |
| S2850 | 15.2 | 14.04 | 164 | Surface crack at 75 sec. |
| PS1936 FL | 15.8 | 14.58 | >400 | Surface crack at 50 sec. |
| S2850 | 12.5 | 11.53 | ~347 | Crack at 200 sec. Readily ignited. |
| PS1936 FL | 13.1 | 12.07 | >400 | No fire; crack at 368 sec. |

*Equivalent weight based on optimum latex formulation of impregnant.

EXPERIMENT IV

Once again, Experiment II was repeated, however, the ¼ inch foam substrate was impregnated with the following formulation:

| | |
|---|---|
| Carboxylated Neoprene Latex (Neoprene Latex 102 sold by E. I. DuPont) | 100 grams |
| Alumina Trihydrate (336 SP sold by Solem Industries) | 125 grams |
| Diammonium Hydrogen Phosphate | 5 grams |
| Urea | 7.5 grams |
| A Non-Ionic Fatty Acid Based Surfactant (Emmersoft 7777 sold by Emery Industries, Inc.) | 1 gram |
| Water | 5 grams |

The impregnated product was cured in an oven for 5 minutes at 150° C. The fire retardant characteristics were evaluated and appear in Table IV.

TABLE IV

| ¼ Inch Impregnated Substrate | Concentration of Impregnant (oz/yd$^2$) | Burns Through Time (Secs.) | Observations |
|---|---|---|---|
| S2850 | 27.1 | >400 | Very good char; Flame over 246 seconds |
| PS1936 FL | 26.8 | >400 | Very good char; Flame over ~60 seconds |
| S2850 | 18.5 | >400 | Very good char; Flame over 202 seconds |
| PS1936 FL | 18.1 | >400 | Very good char; Flame over 190 seconds |
| S2850 | 13.5 | ~200 | Crack at 100 seconds |
| PS1936 FL | 14.1 | >400 | Very good char; Flame over 145 seconds |
| S2850 | 10.92 | >400 | Crack at 31 secs; Over flame 100 secs No fire |
| PS1936 FL | 13.8 | >400 | Very good char; |

TABLE IV-continued

| ¼ Inch Impregnated Substrate | Concentration of Impregnant (oz/yd²) | Burns Through Time (Secs.) | Observations |
|---|---|---|---|
| | | | Flame over 110 seconds |

EXPERIMENT V

Experiment II was again repeated except that the complete formulation of the subject invention was utilized to impregnate the ¼ inch foam substrate. The substrate was impregnated with the following formulation:

| | |
|---|---|
| Carboxylated Neoprene Latex (Neoprene Latex 102 sold by E. I. DuPont) | 100 grams |
| Alumina Trihydrate (336 SP sold by Solem Industries) | 125 grams |
| Diammonia Hydrogen Phosphate | 5 grams |
| Urea | 7.5 grams |
| A Non-Ionic Fatty Acid Based Surfactant (Emmersoft 7777 sold by Emery Industries, Inc.) | 1 gram |
| Magnesium-Zinc Salt Complex (Ongard II sold by National Lead Company) | 1 gram |
| Water | 6 grams |

The impregnated product was cured for 5 minutes in an oven at 150° C. and then adhered to the ¾ inch foam substrate. Flame retardancy characteristics were once again evaluated. The results appear in Table V.

TABLE V

| ¼ Inch Impregnated Substrate | Concentration of Impregnant (oz/yd²) | Burn Through Time (Secs.) | Observations |
|---|---|---|---|
| S2850 | 28.2 | 400 | Over-flame 265 sec; Good char |
| PS1936 FL | 28.4 | 400 | Over-flame 260 sec; Good char |
| S2850 | 18.7 | 400 | Over-flame 187 sec; Good char |
| PS1936 FL | 18.9 | 400 | Over-flame 20 sec; Good char |
| S2850 | 14.0 | 232 | Crack at 50 sec. |
| PS1936 FL | 14.2 | 400 | Over-flame 145 sec; Very Good char |
| S2850 | 11.2 | 136 | Crack at 25 sec; bad fire |
| PS1936 FL | 12.8 | 400 | Over-flame 75 sec. |

EXPERIMENT VI

Various polyether foams were impregnated with the formulation used in Example V. The ¼ inch foam substrate was cured for 5 minutes at 150° C. Those substrates were glued to a ¾ inch substrate of S2850 foam for flame retardant evaluation. The results appear in Table VI.

TABLE VI

| ¼ Inch Impregnated Substrate | Concentration of Impregnant (oz/yd²) | Burn Through Time (Secs.) | Observations |
|---|---|---|---|
| Organo Halide Phosphate Polyether Foam: 2.8 lb/ft³ density; 50 ILD (CS2850 Sold by Reeves Brothers, Inc.) | 14.58 | >400 | S2850 decomp. & melt thru surface |
| High Resiliency Organo Halide Phosphate Polyether Foam: 2.7 ±0.2 lb/ft³ density; 33 ILD (HR 33 sold by Reeves Brothers, Inc.) | 14.85 | >400 | Excellent results |
| Organo Halide Phosphate Polyether Foam: 1.5 lb/ft³ density; 24 ILD (1524 sold by Reeves Brothers, Inc.) | 14.85 | >400 | Very good char |
| Organo Halide Phosphate Polyether Foam: 1.5 lb/ft³ density 23 ILD (S1523 sold by Reeves Brothers, Inc.) | 14.04 | >400 | Very good char |
| Organo Halide Phosphate Polyether Foam: 1.5 lb/ft³ density 23 ILD (CS1523 sold by Reeves Brothers, Inc.) | 14.45 | >400 | Very good char |
| Polyether Foam with a filler: 2.8 lb/ft³ density; 28 ILD (H2828 sold by Reeves Brothers, Inc.) | 14.52 | >400 | Very good char |
| Polyether Foam: 2.8 lb/ft³ density; 24 ILD (A2824 sold by Reeves Brothers, Inc.) | 15.33 | >400 | Very good char |

EXPERIMENT VII

Substrates of S2850 foam were impregnated with the formulation of Example V. The impregnated sample was cured for 5 minutes at 150° C. and adhered to a variety of different ¾ inch foam backings. Flame retardant characteristics were evaluated and those results appear in Table VII.

TABLE VII

| Concentration of ¼ Inch Impregnated S2850 Substrate (oz/yd²) | ¾ Inch Foam Backing | Burn Through Time (Secs.) | Observations |
|---|---|---|---|
| 15.94 | Polyether Foam with a filler: 2.8 lb/ft³ density; 28 ILD (H2828 Sold by Reeves Bros., Inc.) | 196 | Black smoke. Small fire at 85 secs. |
| 14.38 | Organo Halide Phosphate | 238 | Melted at 175 |

TABLE VII-continued

| Concentration of ¼ Inch Impregnated S2850 Substrate (oz/yd²) | ¾ Inch Foam Backing | Burn Through Time (Secs.) | Observations |
|---|---|---|---|
| | Polyether Foam: 1.5 lb/ft³ density; 23 ILD (CS1523 sold by Reeves Brothers, Inc.) | | secs. |
| 18.26 | Organo Halide Phosphate Polyether Foam: 1.5 lb/ft³ density; 23 ILD (S1523 sold by Reeves Brothers, Inc.) | >400 | Melted |
| 15.05 | Polyether Foam: 1.5 lb/ft³ density; 24 ILD (A1524 sold by Reeves Brothers, Inc.) | ~275 | Total flame. Ignited at 318 secs. |
| 14.92 | Organo Halide Phosphate Polyether Foam: 2.8 lb/ft³ density; 50 ILD (CS2850 sold by Reeves Brothers, Inc.) | >400 | Small fire put out at 400 secs. |
| 14.79 | High Resiliency Organo Halide Phosphate Polyether Foam: 2.7 ± 0.2 lb/ft³ density; 33 ILD (HR 33 sold by Reeves Brothers, Inc.) | 400 | Very good |

It is not intended to limit the present invention to the specific embodiments described above. It is recognized that other changes may be made in the formulation specifically described herein without departing from the scope and teachings of the present invention. It is intended to encompass all other embodiments, alternatives and modifications consistent with the present invention.

I claim:

1. A method for rendering polyether-derived polyurethane foam substrates substantially non-flammable comprising:
   (a) depositing on the above substrate a fire retardant amount of a water soluble formulation consisting essentially of:
      (1) a carboxylated neoprene latex, and
      (2) an aluminia trihydrate,
   (b) impregnating the substrate with that formulation,
   (c) curing the impregnated substrate, and
   (d) recovering a substantially non-flammable foam substrate which forms a stable cellular carbonaceous barrier when in contact with a flame.

2. The method of claim 1 wherein the substrate and deposited formulation are nipped during impregnation.

3. The method of claim 1 wherein alumina trihydrate is present in an amount from about 10 to about 180 parts by weight per 100 parts by weight neoprene latex.

4. The method of claim 1 wherein the formulation further comprises diammonium hydrogen phosphate present in an amount about 5 parts by weight per 100 parts by weight neoprene latex.

5. The method of claim 1 wherein the formulation further comprises urea being present in an amount about 7.5 parts by weight per 100 parts by weight neoprene latex.

6. The method of claim 1 wherein the formulation further comprises a magnesium-zinc salt complex being present in an amount from about 1 to about 5 parts by weight per 100 parts by weight neoprene latex.

7. The method of claim 1 wherein the formulation further comprises a surfactant being present in an amount from about 1 to about 2 parts by weight per 100 parts by weight neoprene latex.

8. The method of claim 1 wherein the formulation further comprises water being present in an amount from about 1 to about 50 parts by weight per 100 parts by weight neoprene latex.

9. A substantially non-flammable polyether-derived polyurethane foam product produced according to the method of claim 1.

10. The product of claim 9 configured as a laminate and adhered to a substrate.

11. A substantially non-flammable water soluble impregnant consisting essentially of in combination fire retardant amounts of:
    (a) carboxylated neoprene latex,
    (b) alumina trihydrate,
    (c) diammonium hydrogen phosphate,
    (d) urea, and
    (e) surfactant.

12. The impregnant of claim 11 wherein the ingredients have the following concentrations, all per 100 parts by weight neoprene latex:
    (a) alumina trihydrate present in an amount from about 10 to about 180 parts by weight,
    (b) diammonium hydrogen phosphate present in an amount about 5 parts by weight,
    (c) urea present in an amount about 7.5 parts by weight, and
    (d) surfactant present in an amount from about 1 to about 2 parts by weight.

13. The impregnant of claim 11 which further comprises water present in an amount from about 1 to about 50 parts by weight per 100 parts by weight neoprene latex.

14. The impregnant of claim 11 which further comprises a magnesium-zinc salt complex present in an amount from about 1 to about 5 parts by weight per 100 parts by weight neoprene latex.

15. The impregnant of claim 11 wherein the surfactant is a non-ionic fatty based surfactant.

16. The impregnant of claim 11 wherein the viscosity of impregnant is between about 2600 and about 5500 centipoise.

17. The impregnant of claim 11 wherein the carboxylated neoprene latex is a copolymer of chloroprene with an unsaturated carboxyl acid.

18. The impregnant of claim 17 wherein the carboxyl acid is acrylic acid or methacrylic acid.

* * * * *